(No Model.)

A. MAZZANOVICH.
CAR FENDER.

No. 598,637. Patented Feb. 8, 1898.

WITNESSES:

INVENTOR
A. Mazzanovich.
BY
Carr Deemer Co
ATTORNEYS

UNITED STATES PATENT OFFICE.

ANTON MAZZANOVICH, OF NEW YORK, N. Y.

CAR-FENDER.

SPECIFICATION forming part of Letters Patent No. 598,637, dated February 8, 1898.

Application filed April 13, 1897. Serial No. 631,910. (No model.)

*To all whom it may concern:*

Be it known that I, ANTON MAZZANOVICH, a citizen of the United States, and a resident of New York city, county of New York, and State of New York, have invented certain new and useful Improvements in Car-Fenders, of which the following is a specification, reference being had to the accompanying drawings, forming a part thereof, in which similar letters of reference indicate corresponding parts.

This invention relates to car-fenders, and has for its object to provide a simple and improved apparatus of this class which will possess advantages in point of inexpensiveness, convenience, adjustability, ease of operation, effectiveness, and general efficiency.

Figure 1:
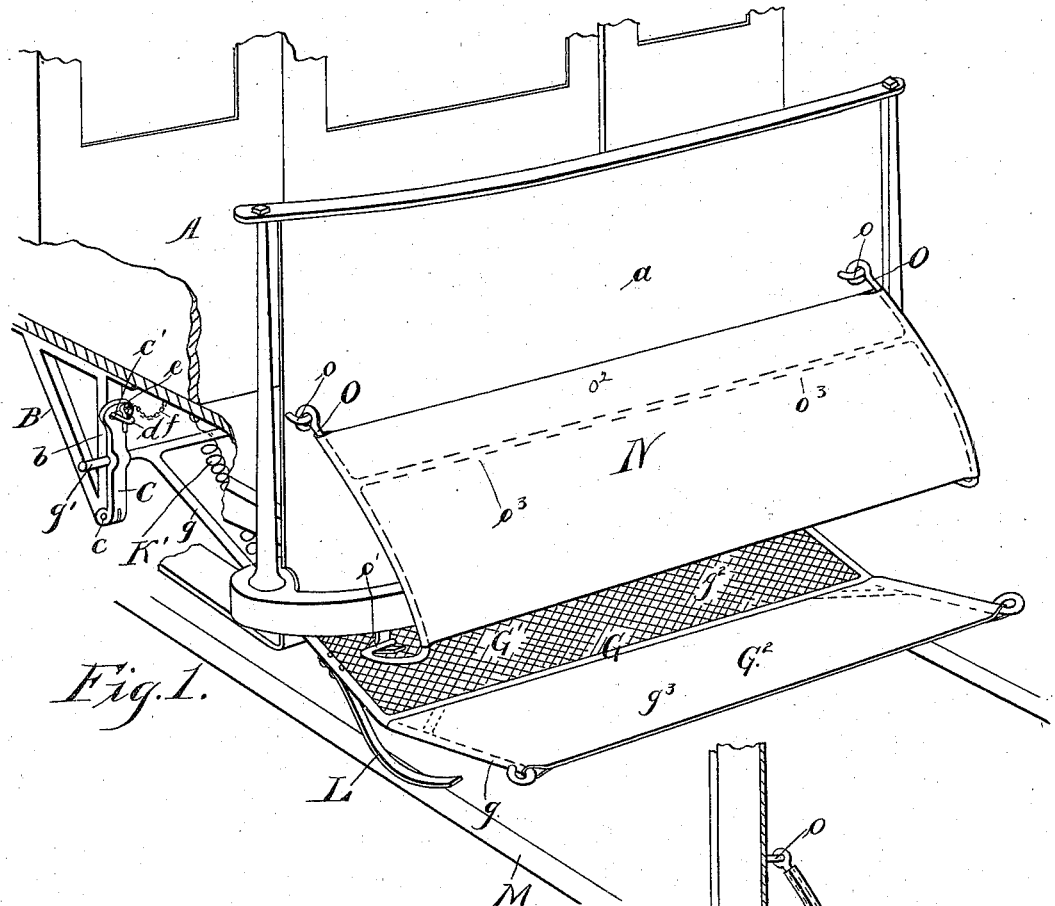
Figure 2:
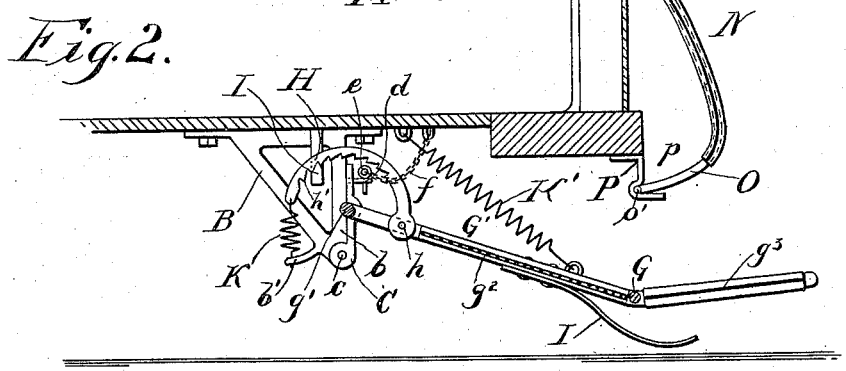

In the drawings, Figure 1 is a perspective view showing the end of the car equipped with my improved fender or apparatus. Fig. 2 is a vertical longitudinal sectional view of the same.

Referring to the drawings, A designates the end platform of the car, having the usual dashboard $a$. Depending from the under side of the bottom of the platform are brackets B, arranged at each side of the car and embodying a vertical front arm $b$, to the lower end of which is hinged, as at $c$, a plate C, said hinged plate and front arm $b$ of the bracket being adapted to conjointly form the pivotal bearing-plate bearing the shaft of the fender, by means of which construction and arrangement embodying the hinged bearing-plates the fender may be readily and conveniently detached from or connected to the car, as desired.

The top end of the hinged plate C is normally fastened to the arms $b$ of the bracket. This fastening may be formed of a staple $d$, projecting from the arms $b$ through a slot $c'$ in the hinged plate C and adapted to receive a locking-pin $e$, suspended by a chain $f$ from the bottom of the car.

G designates the fender, which is preferably constructed with a metallic tubular skeleton frame $g$, embodying arms or gudgeons $g'$, which form the bearings in the supporting-brackets B. The fender comprises a rear portion $G'$, which is normally inclined downwardly and forwardly and is provided with a wire-netting $g^2$.

From the rear main section $G'$ projects a front portion $G^2$. This is arranged at an angle to the portion $G'$ and normally projects forwardly therefrom in a forwardly-inclined manner. This front outer section $G^2$ carries an apron or cover $g^3$ of canvas or other flexible material best suited to break the impact when the fender strikes a person.

At the rear upper end of the fender are provided segmental ratchet-pawls H, pivotally connected, as at $h$, with the frame of the fender at a point in front of its bearing and projecting upwardly and rearwardly over said bearing. The serrated or toothed end edge $h'$ of the pawls H is adapted to engage a fixed ratchet-tooth I, formed by supplementary brackets projecting from the bottom of the car, the relative construction and arrangement being such that when the fender strikes an object and is depressed it will swing downwardly upon its bearings $g'$ and the segmental ratchet-pawl will travel forwardly over the fixed tooth I. A rearward or return movement of the ratchet-pawl and corresponding movement of the fender will be prevented by the tooth I, so that after the fender is depressed it will automatically remain down in operative position. Equalizing-springs K and K' are respectively arranged between the free rear ends of the ratchet-pawls and a portion $b'$ of the bracket B and between the bottom of the platform and the main portion $G'$ of the fender, as shown.

The plate-springs L may be arranged at the sides of the fender, with their upper ends secured to the frame $g$ of the fender and their free ends projecting downwardly and forwardly and adapted to rest upon the rails M when the fender is depressed to reduce the jarring and forming a cushion while the fender is retained in depressed operative position.

N designates a supplementary fender, which is arranged above the main fender G in front of the bottom portion of the dashboard and end of the car-platform and forms a cushion for relieving the impact when the person is struck by the fender and for preventing injury by contact with the dashboard or end of the platform. This supplementary cushion or fender may be formed of two downwardly or forwardly inclined arms O O, pivotally connected at their top ends, as at o, with the dashboard A and having their bottom inwardly-extended ends provided with the lateral fingers or projections $o'$, received in a socket or recess $p$ of bracket P, projecting from the end of the platform. The arms O O carry an apron $o^2$, of canvas or other flexible material, which extends over or in front of the lower portion of the dashboard and the bottom end or the framework of the platform, these said arms are maintained in suitable relative position by means of a cross-brace $o^3$. The canvas apron is adapted to contain suitable advertising matter, if desired.

Having thus described my invention, what I claim as new, and desire to secure by Letters Patent, is—

1. An improved car-fender, comprising a fender, provided with bearing-arms or gudgeons, and suspending-brackets embodying an arm and a relatively-hinged leaf or plate conjointly forming the bearings, substantially as and for the purpose set forth.

2. An improved car-fender, comprising a fender proper pivotally hinged and mounted in position, and segmental ratchet pawls or arms, pivotally connected with the fender at one end and with a spring upon the bracket at the other end, and operating in relation to a ratchet-tooth to lock the fender in its pivotal movement downwardly, substantially as and for the purpose set forth.

3. An improved car-fender, comprising the fender proper pivotally hinged or mounted in position, segmental ratchet pawls or arms having their front lower ends pivotally connected to the fender at a point in front of the pivotal hinge or bearing of the latter, and extending upwardly and rearwardly over said pivotal hinge or bearing, and their rear ends connected by a spring to the brackets, and a tooth arranged with relation to said segmental ratchet-plate, whereby the fender is locked in its downward pivotal movement, substantially as and for the purpose set forth.

4. An improved car-fender, comprising a fender proper, pivotally hinged or mounted in position, the segmental ratchet pawls or arms pivotally connected to the fender, the portions engaging said pawls and the balance-springs respectively extending from the free end of the segmental ratchet-pawls and from the fender to fixed portions of the framework, substantially as and for the purpose set forth.

5. An improved car-fender, comprising the fender proper, pivotally mounted in bearings and brackets projecting from the under side of the car, the segmental ratchet-pawls having their free ends pivotally connected to the fender in front of the bearings of the latter and extended upwardly and rearwardly over said bearings, the portions engaging said ratchet-pawls, and the spring extending between the free end of the segmental ratchet-pawls and the fixed portion of the framework, substantially as and for the purpose set forth.

6. In a car-fender mechanism, the combination with the fender proper projecting below the end platform, of a supplementary fender mounted upon the dashboard above the main fender and connected to brackets in the end of the platform and comprising downwardly-extended arms pivoted to the dashboard and having lateral projections engaging the brackets, said arms carrying an apron of flexible material, and forming a cushion, substantially as and for the purpose set forth.

In testimony that I claim the foregoing as my invention I have signed my name, in presence of two witnesses, this 9th day of April, 1897.

ANTON MAZZANOVICH.

Witnesses:
E. TIBBITS,
C. SEDGWICK.